(12) United States Patent
Lee et al.

(10) Patent No.: US 10,106,188 B2
(45) Date of Patent: Oct. 23, 2018

(54) STEERING WHEEL COOLING SYSTEM

(71) Applicant: HYUNDAI MOTOR COMPANY, Seoul (KR)

(72) Inventors: Sang Shin Lee, Suwon-si (KR); Jae Woo Park, Ansan-si (KR); So Yoon Park, Suwon-si (KR); Man Ju Oh, Yongin-si (KR); Jae Woong Kim, Hwaseong-si (KR); So La Chung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/499,572

(22) Filed: Apr. 27, 2017

(65) Prior Publication Data

US 2018/0111637 A1 Apr. 26, 2018

(30) Foreign Application Priority Data

Oct. 21, 2016 (KR) ........................ 10-2016-0137947

(51) Int. Cl.
| | |
|---|---|
| *B62D 1/06* | (2006.01) |
| *B60H 1/00* | (2006.01) |
| *B62D 1/08* | (2006.01) |
| *B62D 1/10* | (2006.01) |

(52) U.S. Cl.
CPC ......... *B62D 1/065* (2013.01); *B60H 1/00292* (2013.01); *B60H 1/00335* (2013.01); *B60H 1/00478* (2013.01); *B62D 1/08* (2013.01); *B62D 1/10* (2013.01)

(58) Field of Classification Search
CPC . B62D 1/065; B62D 1/08; B62D 1/10; B60H 1/00292; B60H 1/00335; B60H 1/00478
See application file for complete search history.

(56) References Cited

U.S. PATENT DOCUMENTS

| | | | |
|---|---|---|---|
| 4,947,735 A | 8/1990 | Guillemin | |
| 5,476,418 A | 12/1995 | Loup | |
| 5,850,741 A * | 12/1998 | Feher ................. | B60H 1/00292 62/3.61 |
| 6,520,850 B1 | 2/2003 | Buckman et al. | |

(Continued)

FOREIGN PATENT DOCUMENTS

| | | |
|---|---|---|
| EP | 0865945 A1 | 9/1998 |
| JP | 2004-210267 A | 7/2004 |

(Continued)

OTHER PUBLICATIONS

Office Action dated Jan. 2, 2018 in corresponding Korean Patent Application No. 10-2016-0137947—6 pages.

(Continued)

*Primary Examiner* — Thomas C Diaz
(74) *Attorney, Agent, or Firm* — Knobbe Martens Olson & Bear LLP

(57) ABSTRACT

Disclosed is a steering wheel having cooling system inside. A steering wheel includes a hub connected to a steering column, a rim provided with a hollow formed therein and spokes configured to connect the hub and the rim. Cooling units located at the hub or the spokes of the steering wheel is provided to supply cooling air. Heat pipes thermally connect the cooling units and the rim of the steering wheel.

5 Claims, 4 Drawing Sheets

(56) References Cited

U.S. PATENT DOCUMENTS

| | | |
|---|---|---|
| 7,775,451 B2 | 8/2010 | Leoni |
| 8,544,533 B2 | 10/2013 | Lee |
| 2003/0045224 A1 | 3/2003 | Vincent |
| 2003/0201096 A1 | 10/2003 | Perry et al. |
| 2004/0168540 A1* | 9/2004 | Weiss .................... B62D 1/065 74/552 |
| 2005/0118944 A1 | 6/2005 | Vincent et al. |
| 2005/0233687 A1 | 10/2005 | Wachter |
| 2008/0200110 A1 | 8/2008 | Ghosh et al. |
| 2012/0295529 A1 | 11/2012 | Fukutomi et al. |
| 2015/0217629 A1 | 8/2015 | Kawanishi |

FOREIGN PATENT DOCUMENTS

| | | | |
|---|---|---|---|
| JP | 2008308123 A * | 12/2008 | ............... B62D 1/06 |
| JP | 2015-105071 A | 6/2015 | |
| KR | 20-2009-0008039 U | 8/2009 | |
| KR | 10-2014-0143508 A | 12/2014 | |

OTHER PUBLICATIONS

Office Action dated May 16, 2018 of corresponding U.S. Appl. No. 15/587,191—18 pages.

* cited by examiner

STEERING WHEEL COOLING SYSTEM

CROSS-REFERENCE TO RELATED APPLICATION

This application claims the priority benefit of Korean Patent Application No. 10-2016-0137947, filed on Oct. 21, 2016, in the Korean Intellectual Property Office, the disclosure of which is incorporated herein by reference.

BACKGROUND

Field

The present disclosure relates to a steering wheel which has a cooling function.

Description of the Related Art

In general, a steering wheel is a steering system which is provided at a driver's seat to move vehicle wheels.

The steering wheel includes a hub connected to a steering column, a circular rim gripped by a driver with hands so as to be turned, and spokes connecting the rim and the hub.

Recently, in addition to the basic function of the steering wheel, various additional functions of the steering wheel are provided so as to improve commercial value of vehicles. That is, a leather cover may be provided on a rim so as to achieve quality improvement in a vehicle interior material, wood grain may be provided according to sections of a steering wheel, and cooling or heating of the steering wheel may be executed according to temperature change.

Particularly, in case of a steering wheel which may execute cooling, a cooling unit is located at a rim at which driver's hands are mainly located. However, the cooling unit is located at the narrow inside of the rim and thus has poor operating efficiency, and pressure, friction, torsion, etc. are applied to the cooling unit according to operation of the steering wheel by a driver and thus the cooling unit is easily damaged.

The above description has been provided to aid in understanding of the background of the present invention and should not be interpreted as conventional technology known to those skilled in the art.

The disclosure of this section is to provide background of the invention. Applicant notes that this section may contain information available before this application. However, by providing this section, Applicant does not admit that any information contained in this section constitutes prior art.

SUMMARY

It is an aspect of the present invention to provide a steering wheel cooling system in which the positions of cooling units are spaced apart from the position of a rim so as to prevent damage to the cooling units, and the rim has a pipe shape having a hollow formed therein so as to reduce thermal capacity of a target object to be cooled and thus to rapidly lower temperature.

In accordance with embodiments of the present invention, the above and other features can be accomplished by the provision of a steering wheel cooling system including a steering wheel including a hub connected to a steering column, a rim provided with a hollow formed therein, and spokes configured to connect the hub and the rim, cooling units located at the hub or the spokes of the steering wheel so as to supply cool air, and first heat pipes configured to thermally connect the cooling units and the rim of the steering wheel.

The rim may have a pipe shape and be formed of a metal, the central portions of the first heat pipes may be thermally connected to the cooling units, and both ends of the first heat pipes may pass by the spokes, extend in opposite directions along the circumference of the rim and be thermally connected to the inner surface of the rim.

The steering wheel cooling system may further include second heat pipes extending in the circumferential direction of the rim, located so as to traverse connection portions between the spokes and the rim, and thermally connected to the inner surface of the rim.

The cooling units may be radiation fins, and the steering wheel cooling system may further include a cooling duct provided with one end connected to a vehicle air conditioner and the other end connected to the radiation fins so as to supply cool air of the vehicle air conditioner to the radiation fins.

The cooling units may be thermoelectric elements, each thermoelectric element being provided with a cooling surface connected to the first heat pipe and a radiation surface coupled with a radiation fin, and the steering wheel cooling system may further include a cooling duct provided with one end connected to a vehicle air conditioner and the other end connected to the radiation fins so as to supply cool air of the vehicle air conditioner to the radiation fins.

An air insulating layer may be formed in the hollow of the rim.

BRIEF DESCRIPTION OF THE DRAWINGS

Features and other advantages of embodiments of the present invention will be more clearly understood from the following detailed description taken in conjunction with the accompanying drawings, in which.

DETAILED DESCRIPTION

Figure 1:
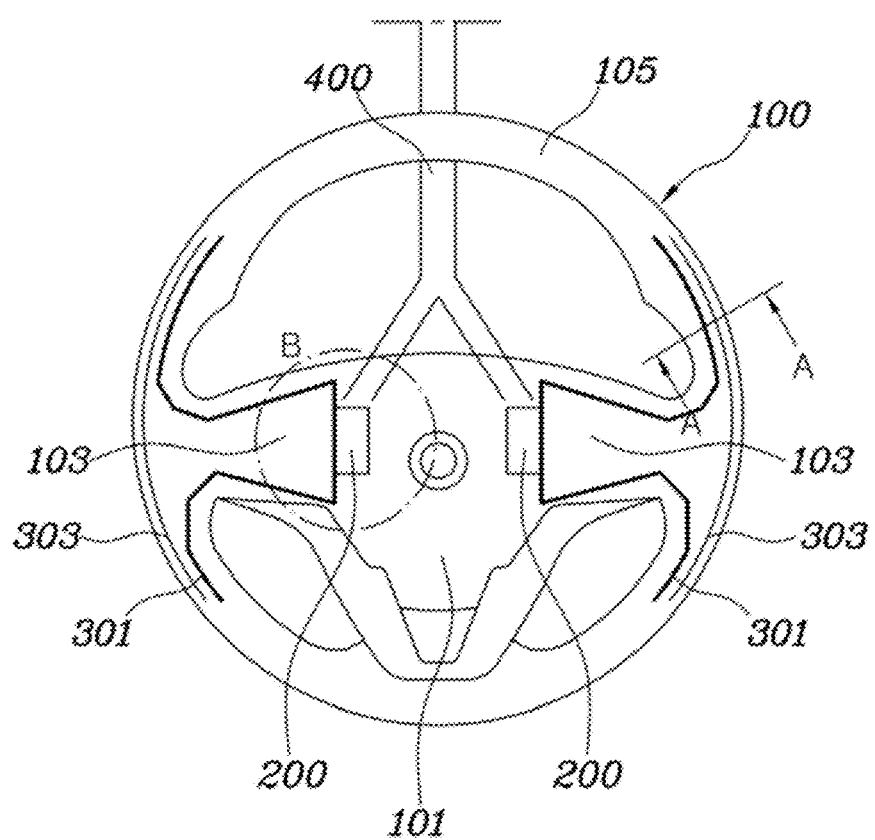
FIG. 1 is a schematic view of the configuration of a steering wheel cooling system in accordance with one embodiment of the present invention.

Reference will now be made in detail to embodiments of the present invention, examples of which are illustrated in the accompanying drawings. Wherever possible, the same reference numbers will be used throughout the drawings to refer to the same or like parts.

An aspect of the present invention provides a steering wheel 100 of a vehicle having a cooling system inside. In embodiments, the cooling system includes a heat exchanger in the hub 101 of the steering wheel 100.

In embodiments, a first heat pipe 301 thermally connected to the heat exchanger extends to the rim 105 though a spoke 103 of the steering wheel 100. The first heat pipe 301 (solid or hollow pipe) includes a first portion extending along (and through) the spoke 103 and a second portion extending along (and through) the rim 105. In embodiments, a second heat pipe 303 extending along the rim 105 is provided as well. In some embodiments, a thermoelectric device 203 is interposed between the first heat pipe 301 and the fin 201.

In embodiments, an air duct 400 extending along with (through) the column of the steering wheel reached up to the hub 101 and thermally connected to the heat exchanger disposed in the hub. In embodiments, the heat exchanger inside the steering wheel includes at least one fin 201 thermally connected to the air duct 400. Air cooled at an air-conditioning system of the vehicle flows into the air duct 400, exchange heat with the fin 201, and flows out from the air duct 400.

Figure 2:
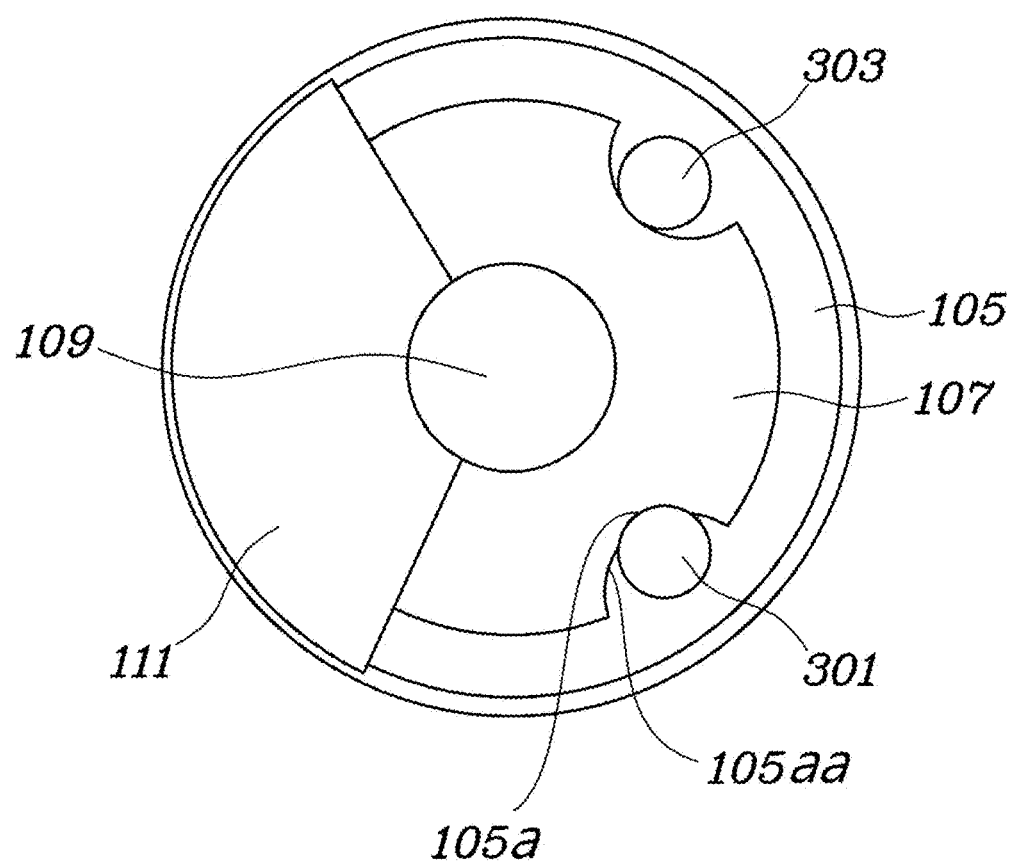
FIG. 2 is a cross-sectional view taken along line A-A of FIG. 1.
Figure 3:
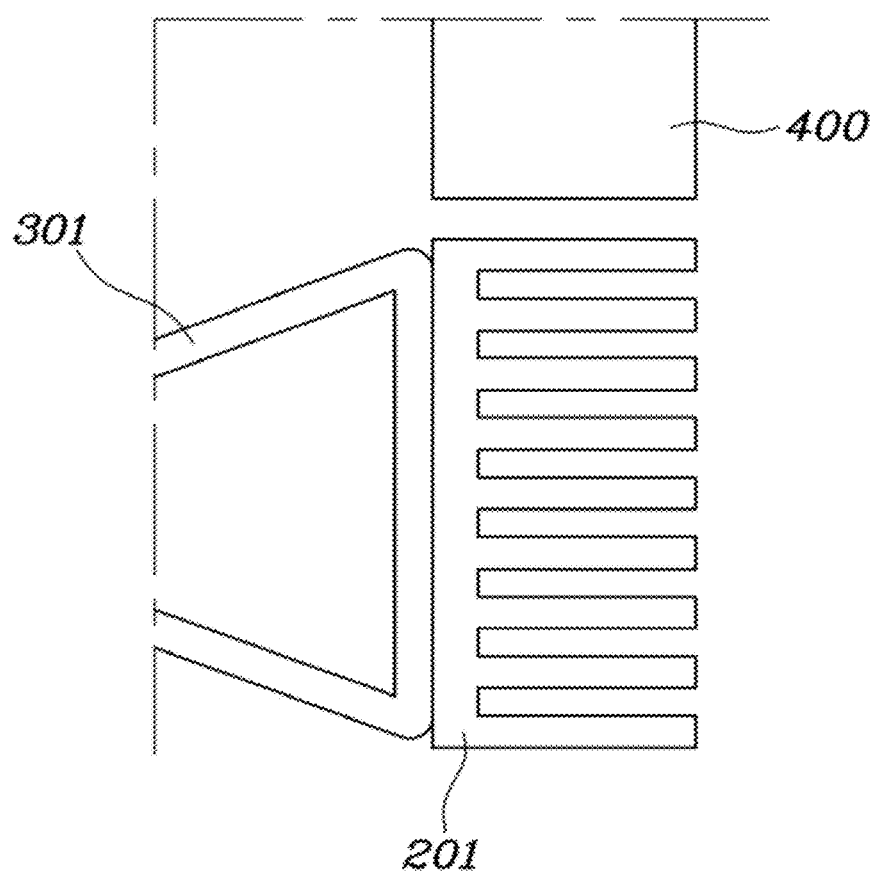
FIGS. 3 and 4 are enlarged views of a portion B of FIG. 1, illustrating cooling units in accordance with various embodiments of the present invention.
Figure 4:
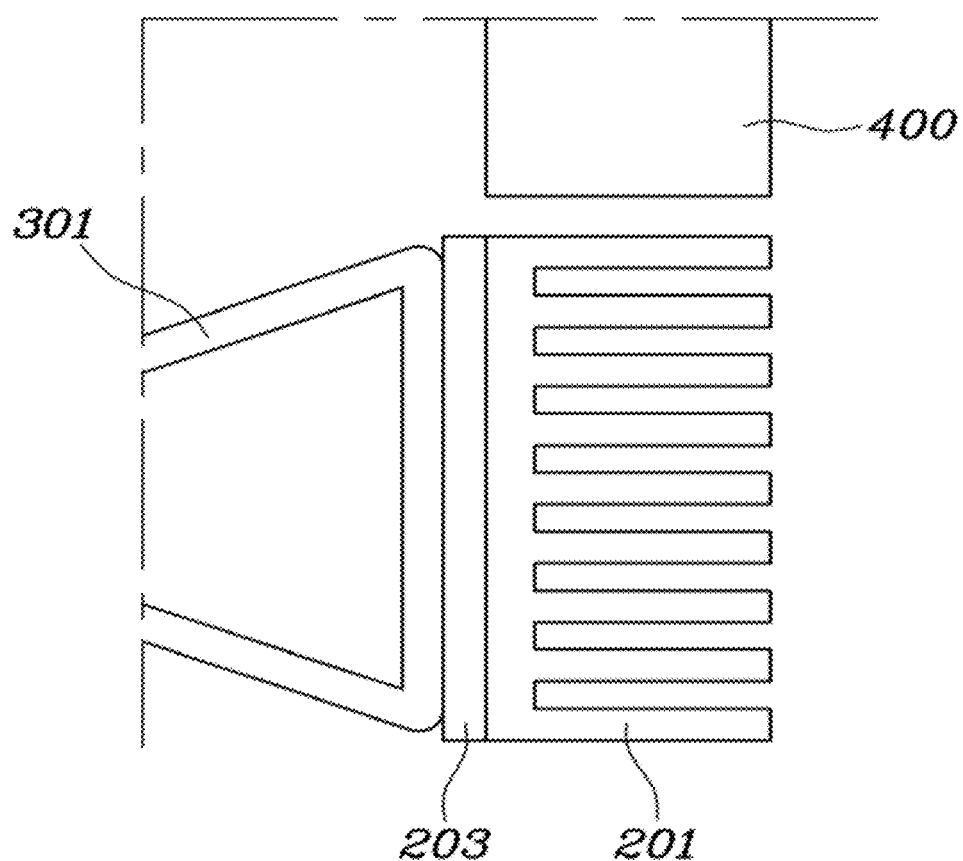

Referring to FIGS. 1 and 2, the rim 105 includes an armature 109, a solid core 111 extending along the armature 109, and a hollow channel 107 extending along the armature 109 and the heat pipes 301, 303. The heat pipes 301, 303 extend along the armature 109 such that in a first cross section taken in a radial direction of the wheel 100 across the rim 105 (FIG. 2) shows all of the armature 109, the solid core 111, the hollow channel 107 and the heat pipes 301, 303, and further such that in a second cross section taken in another radial direction show no heat pipe or no hollow channel. In FIG. 2, the first heat pipe 301 is received in a groove 105aa of the rim 105 to form a protrusion toward the armature 109. FIG. 1 is a schematic view of the configuration of a steering wheel cooling system in accordance with one embodiment of the present invention, FIG. 2 is a cross-sectional view taken along line A-A of FIG. 1, and FIGS. 3 and 4 are enlarged views of a portion B of FIG. 1, illustrating cooling units in accordance with various embodiments of the present invention.

A steering wheel cooling system in accordance with an embodiment of the present invention includes a steering wheel 100 including a hub 101 connected to a steering column, a rim 105 provided with a hollow formed therein and spokes 103 connecting the hub 101 and the rim 105, cooling units 200 (heat exchanger) located at the hub 101 or the spokes 103 of the steering wheel 100, and first heat pipes 301 thermally connecting the cooling units 200 and the rim 105 of the steering wheel 100.

In the present invention, as exemplarily shown in FIG. 1, the cooling units 200 to cool the rim 105 are not located at the rim 105 but are disposed at the hub 105 or the spokes 301. However, since driver's skin substantially contacts the rim 105 during driving, cool air generated by the cooling units 200 is transmitted to the rim 105 using the first heat pipes 301.

The cooling units 200 may be directly located at the rim 105 and, in this case, the cooling units 200 may be damaged by pressure, frictional force, torsion, etc. applied to the rim 105 during a process of operating the steering wheel 100 by a user. Therefore, damage to the cooling units 200 is prevented by spacing the positions of the cooling units 200 apart from the position of an object to be cooled.

The rim 105 has a pipe shape and is formed of a metal. The central portions of the first heat pipes 301 may be thermally connected to the cooling units 200, and both ends of the first heat pipes 301 may pass by the spokes 103, extend in opposite directions along the circumference of the rim 105 and be thermally connected to the inner surface of the rim 105.

Cool air generated by the cooling units 200 may be transmitted to the entirety of the rim 105 so as to uniformly cool the entirety of the rim 105 but, in this case, speed of cooling is lowered. Therefore, in the present invention, some regions of the rim 105 around connection portions between the rim 105 and the spokes 103 are cooled first.

Regions of the rim 105 which are mainly gripped by a driver with hands are located at positions where weight of the arms is dispersed to reduce burden and rotary force may be firmly transmitted during steering, i.e., positions of the connection portions between the rim 105 and the spokes 103. The reason for this is that the weight of the arms may be dispersed through physical support structures by placing fingers on the spokes 103 as well as simply by frictional force between the rim 105 and palms, and it is easy to firmly transmit rotary force through the spokes 103 during steering.

Therefore, in the present invention, the connection portions between the rim 105 and the spokes 103 at which driver's hands are mainly located are cooled first.

In more detail, the cooling units 200 and the rim 105 are connected through the first heat pipes 301, the first heat pipes 301 extending from the cooling units 200 pass by the spokes 103, extend in opposite directions along the circumference of the rim 105, and are thermally connected to the inner surface of the rim 105. The first heat pipes 301 are directly connected to the connection portions between the rim 105 and the spokes 103 and, thus, the connection portions are cooled first of all.

However, since the driver may contact other portions of the rim 105 as well as the connection portions of the rim 105 to the spokes 103, it is necessary to cool the entirety of the rim 105. Therefore, in the present invention, the rim 105 is formed of a metal having excellent thermal conductivity and, thus, the entirety of the rim 105 as well as the connection portions of the rim 105 to the first heat pipes 301 may be cooled through conduction. The rim 105 may be formed of aluminum having excellent thermal conductivity, light weight and good durability.

Further, the first heat pipes 301 contact the inner surface of the rim 105 formed of a metal and may thus interrupt pressure, frictional force and torsion transmitted by operating the steering wheel 100 by a user, thereby securing durability.

The steering wheel cooling system may further include second heat pipes 303 extending in the circumferential direction of the rim 105, located so as to traverse the connection portions between the spokes 103 and the rim 105, and thermally connected to the inner surface of the rim 105.

The connection portions between the spokes 103 and the rim 105 are regions at which driver's hands are mainly located and thus require rapid cooling. Therefore, the second heat pipes 303 may rapidly diffuse cool air transmitted through the first heat pipes 301 to regions of the rim 105 around the spokes 103.

The cooling units 200 may be radiation fins, and the steering wheel cooling system may further include a cooling duct 400 provided with one end connected to a vehicle air conditioner and the other end connected to the radiation fins 201 so as to supply cool air of the air conditioner to the radiation fins 201.

Cool air generated by the air conditioner is used to generate cool air by the cooling units 200. As exemplarily shown in FIG. 3, a part of cool air from the air conditioner is supplied to the steering wheel 100 using the cooling duct 400 and corresponding cool air is absorbed by the radiation fins 201 and thus transmitted to the rim 105.

The cooling units 200 are thermoelectric elements 203, each of which is provided with a cooling surface connected to the first heat pipe 301 and a radiation surface coupled with a radiation fin 201, and the steering wheel cooling system may further include a cooling duct 400 provided with one end connected to a vehicle air conditioner and the other end connected to the radiation fins 201 so as to supply cool air of the air conditioner to the radiation fins 201.

As a method using a separate element to generate cool air, cool air may be generated using the thermoelectric element 203, as exemplarily shown in FIG. 4. In more detail, heat radiation from the thermoelectric element 203 is assisted using cool air supplied through the air conditioner and, thus, efficiency of the thermoelectric element 203 is maximized.

An air insulating layer 107 may be formed in the hollow of the rim 105.

The first heat pipes 301, the second heat pipes 303, an armature 109, a core 111, etc. are located within the hollow of the rim 105, and a residual space of the hollow of the rim 105 is vacant and thus forms the air insulating layer 107. Thereby, the weight of the rim 105, i.e., an object to be finally cooled by the cooling units 200, is reduced and, thus, thermal capacity may be reduced and rapid cooling may be secured. Further, external heat, which may be transmitted to the rim 105 or the first and second heat pipes 301 and 303 through various factors, may be interrupted.

As is apparent from the above description, in a steering wheel cooling system in accordance with the present invention, the positions of cooling units are spaced apart from the position of a rim and may thus prevent damage to the cooling units due to operation of a steering wheel, and thermal capacity is reduced using the rim provided with a hollow formed therein and thus the rim may be rapidly cooled.

Further, since the cooling units and the rim are connected through heat pipes, if temperature of one end of the heat pipe is raised according to operation of the steering wheel by a driver, a large temperature difference between the heat pipe and the cooling unit occurs, operating efficiency of the heat pipe is further raised and, thus, the rim may be rapidly cooled.

Although embodiments of the present invention have been disclosed for illustrative purposes, those skilled in the art will appreciate that various modifications, additions and substitutions are possible.

What is claimed is:

1. A steering wheel cooling system for a vehicle, comprising:
 a steering wheel including a hub connected to a steering column, a rim provided with a hollow channel formed therein, and spokes configured to connect the hub and the rim;
 a cooling unit located at the hub or the spokes of the steering wheel so as to supply cool air; and
 a first heat pipe configured to thermally connect the cooling unit and the rim of the steering wheel,
 wherein the rim has a pipe shape and is formed of a metal, wherein a central portion of the first heat pipe is thermally connected to the cooling unit, wherein both ends of the first heat pipe pass by the spokes, extend in opposite directions along a circumference of the rim, and are thermally connected to an inner surface of the rim,
 wherein the rim is provided with a protrusion protruding from an inner circumferential surface toward the central portion to form a groove on an inner side, and the first heat pipe is disposed in the groove of the protrusion so as to be spaced apart from an outer circumferential surface of the rim by a predetermined distance.

2. The steering wheel cooling system according to claim 1, further comprising a second heat pipe extending along a circumferential direction of the rim, located so as to traverse a portion of the rim connected to the spokes.

3. The steering wheel cooling system according to claim 1, wherein the cooling unit comprises radiation fins, wherein the steering wheel cooling system further comprises a cooling duct configured to supply cool air from an air conditioner of the vehicle to the radiation fins.

4. The steering wheel cooling system according to claim 1, wherein the cooling unit comprises a thermoelectric element, the thermoelectric element being provided with a cooling surface connected to the first heat pipe and a radiation surface coupled with a radiation fin,
 wherein the steering wheel cooling system further comprises a cooling duct configured to supply cool air from an air conditioner of the vehicle to the radiation fins.

5. The steering wheel cooling system according to claim 1, wherein an air insulating layer is formed in the hollow channel of the rim.

* * * * *